United States Patent [19]

Ikeda et al.

[11] Patent Number: 5,421,982
[45] Date of Patent: Jun. 6, 1995

[54] ELECTRICALLY CONDUCTIVE POLYMER GEL AND THE METHOD FOR MANUFACTURING THE SAME AND AN ORGANISM-USE ELECTRODE WITH THE USE THEREOF

[75] Inventors: Toshiki Ikeda, Otsu; Yoshikazu Kobayashi, Nara; Shuichi Sasahara, Nara; Takashi Higashi, Nara, all of Japan

[73] Assignee: Sekisui Kaseihin Kogyo Kabushiki Kaisha, Nara, Japan

[21] Appl. No.: 119,439

[22] Filed: Sep. 13, 1993

[30] Foreign Application Priority Data

Sep. 16, 1992 [JP] Japan .................. 4-246355
Sep. 16, 1992 [JP] Japan .................. 4-246356

[51] Int. Cl.⁶ ............................. G01N 27/26
[52] U.S. Cl. ......................... 204/414; 204/403;
204/418; 204/421; 435/817; 429/192; 128/639;
128/640; 252/518; 252/521; 252/512; 528/317;
528/319; 528/499; 528/503
[58] Field of Search .......... 204/403, 418, 414, 421;
435/817; 429/192; 528/317, 319, 503, 499;
128/639, 640; 252/518, 521, 512

[56] References Cited

U.S. PATENT DOCUMENTS

| | | | |
|---|---|---|---|
| 4,333,850 | 6/1982 | Krueger | 252/389 |
| 4,695,354 | 9/1987 | Sugihara et al | 204/180.1 |
| 4,786,277 | 11/1988 | Powers et al. | 604/20 |
| 5,183,879 | 2/1993 | Yuasa et al. | 528/503 |
| 5,290,418 | 3/1994 | Menchen et al. | 204/299 R |
| 5,314,952 | 5/1994 | Choi et al. | 525/119 |

FOREIGN PATENT DOCUMENTS 2-32892  7/1990 Japan .
2-212504A 7/1989 United Kingdom .

*Primary Examiner*—John Niebling
*Assistant Examiner*—Bruce F. Bell
*Attorney, Agent, or Firm*—Nikaido, Marmelstein, Murray & Oram

[57] ABSTRACT

An electrically conductive polymer gel is composed of a crosslinked polyacrylamide polymer including an electrolytic salt, water and a polyhydric alcohol uniformly dissolved therein, wherein the water and the polyhydric alcohol are major components of said polymer gel. The polyacrylamide series polymer in the gel has properties of being hydrophilic and being a nonelectrolyte. Therefore, a desirable connection between the gel and the electrode can be achieved with low impedance. Moreover, the polyhydric alcohol reduces the drying speed of the electrically conductive polymer gel, thereby preventing an increase in the impedance due to the dryout of the gel. Therefore, the electrically conductive polymer gel of the present invention permits an accurate measurement of an electrical phenomenon in an organism for long periods of time.

29 Claims, 3 Drawing Sheets

ELECTRICALLY CONDUCTIVE POLYMER GEL AND THE METHOD FOR MANUFACTURING THE SAME AND AN ORGANISM-USE ELECTRODE WITH THE USE THEREOF

FIELD OF THE INVENTION

The present invention relates to an electrically conductive polymer gel for use as a sensor element for a humidity sensor, a pressure sensor etc., a solid electrolyte solution for electric capacitor, battery, etc., and as an organism-use electrode, the method of manufacturing the same, and an organism-use electrode using the electrically conductive polymer gel. More specifically, this invention relates to an electrically conductive polymer gel from the acrylamide series which shows a low impedance for long periods of time and which has a strong adhesive property, the method for manufacturing the same, and an organism-use electrode using the electrically conductive polymer gel.

BACKGROUND OF THE INVENTION

Electrically conductive polymer gel itself may be used as an electrolytic capacitor and a solid electrolyte solution for an electric capacitor, battery, etc., or it may be used by formulating it to adhere to an electrode element of a humidity sensor, a pressure sensor, etc., and as an organism-use electrode.

In the medical field, in order to conduct an appropriate treatment, the potential of an organism is often measured by an electrocardiogram, electromyogram, brain waves, etc. Electrical treatment by transmitting an electric signal into the organism also increases. In the above measurement or treatment, the organism-use electrode which serves as a medium between the organism and an external equipment plays an important role.

For example, when measuring the potential of an organism, the organism-use electrode must be brought in direct contact with a part of the organism in order to derive an effective use of a weak electric signal to be transmitted to the electrocardiogram, etc. However, direct contact between the electrode and the skin of the organism does not permit a desirable electric junction. An unstable junction between the organism-use electrode and the skin of the organism causes complications with respect to potential and impedance. Thus, an electric signal cannot be detected accurately.

In order to counteract the above problem, the following method has been proposed: the organism-use electrode is connected to a part of the skin of the organism through an electrically conductive polymer gel which permits an electric signal to be sent from the organism to the external equipment by making the organism-use electrode in stable contact with the skin of the organism without stimulating it.

In the above method, for example, electrically conductive polymer gel from the acrylic acid sodium series with a property of shape retention may be used. This electrically conductive polymer gel can be formed beforehand into predetermined thickness and shape, and it is used by forming it to adhere to an electrode element to be one integral part. The above organism-use electrode is convenient since it is disposable and it eliminates the application process.

However, the above electrically conductive polymer gel from the acrylic acid sodium series presents the following problems:

For example, when measuring an electrocardiogram, the current flow of an electrocardiogram signal is electromotive in heart→tissue→skin→electrically conductive polymer gel→electrode element→lead wire→amplifier in the electrocardiogram→lead wire→electrode element→electrically conductive polymer gel→skin→tissue→electromotive in the heart. In this case, current flows from the organism to the electrically conductive polymer gel as ions move. On the other hand, current flows from the electrode element to the amplifier by free electrons. Additionally, ions and free electrons can be freely exchanged between the surface of the electrode element and the electrically conductive polymer gel.

The electrically conductive polymer gel from the acrylic acid sodium series has the property of being hydrophilic in nature, and the polymer thereof is electrolytic and electrically conductive. Thus, the complete conjunction between the electrically conductive polymer gel and metal series in general cannot be achieved due to an electric repulsion between the electrode element of metal series in general. Moreover, an exchange between ions and free electrons cannot be fully carried out. As a result, the impedance at the interface increases, and precise measurement of the electrical phenomenon of the organism cannot be ensured.

The Japanese Laid-Open Patent Publication 15728/1981 (Tokukaisho 56-15728) discloses an electrically conductive material which includes 70% by weight glyceline and thorium chloride in nonelectrolyte polyacrylamide. However, this electrically conductive material is hard and shows large impedance since it does not include liquid of low viscosity such as water.

In order to counteract the above problem, the Japanese Examined Laid-Open Patent Publication 22839/1986 (Tokukaisho 61-22839) discloses an electrically conductive polymer gel which includes sucrose and a large quantity of water in the polyacrylamide. Having nonelectrolyte, shape retentive and flexible nature, the junction between the electrode element and the skin of the organism can be improved, thereby reducing the impedance.

However, this electrically conductive polymer gel presents another problem: sucrose cannot suppress the evaporation of water, resulting in an increase in the impedance as it dries out in relatively short periods of time. Thus, the electrical phenomenon in the organism cannot be measured accurately over longer periods of time.

Moreover, since the tackiness of the electrically conductive polymer gel is low, a desirable adhesive property to the electrode element cannot be ensured and a part of gel may separate from skin or from the electrode element while being used. Moreover, a hot spot is likely to appear between the gel and the skin. In order to prevent the separation of the gel and the appearance of the hot spot, it is required to restrict the degree of freedom of the target organism.

For the electrode element, carbon, Ag/AgCl, german silver (alloy consisting of Cu, Ni or Zn) may be used according to the use for which it is intended. However, the component Cu of german silver is corroded by water, electrolyte, etc., and the corrosion of Cu is expedited by the acrylamide of the electrically conductive polymer gel, resulting in an increase of the impedance. For this reason, the electrode cannot be used many times. Moreover, it is not possible to form beforehand the electrode element and german silver as one integral part.

SUMMARY OF THE INVENTION

In order to overcome the above problems raised in the conventional electrically conductive polymer gel from the polyacrylamide series, earnest research and development have been made.

Therefore, a principal object of the present invention is to provide an electrically conductive polymer gel having improved properties.

More specifically, an object of the present invention is to provide an electrically conductive polymer gel which shows a low impedance and which permits an accurate measurement even with the use of a weak electric signal.

Another object of the present invention is to provide an electrically conductive polymer gel which shows low impedance for long periods of time and which permits a repetitive use thereof without reducing the measuring accuracy.

Yet another object of the present invention is to provide an electrically conductive polymer gel which prevents an increase in the impedance at the interface in contact with an electrode element.

Yet another object of the present invention is to provide an electrically conductive polymer gel having desirable tackiness and an ability to adhere to an electrode element or a target organism, which permits a safe use thereof for the organism without separating.

Yet another object of the present invention is provide an electrically conductive polymer gel which prevents erosion of the electrode element and which maintains a low impedance for long periods of time.

Yet another object of the present invention is to provide an electrically conductive polymer gel which ensures a safe use thereof for the organism by minimizing a free residual monomer quantity.

Yet another object of the present invention is to provide a method for effectively manufacturing an electrically conductive polymer gel having the above properties by the polymerization and crosslinking of the gel.

Yet another object of the present invention is to provide an improved organism-use electrode with the use of the electrically conductive polymer gel having the above properties.

The electrically conductive polymer gel of the present invention is characterized in an electrolytic salt is uniformly contained in a crosslinked polyacrylamide polymer which includes at least water, and a penetrant, such as polyhydric alcohol, etc., as major components. The electrically conductive polymer gel of the present invention is also characterized in that an epoxy crosslinker and metallic ion sealing compound which has vapor pressure at room temperature are uniformly contained therein.

According to the method for manufacturing the electrically conductive polymer gel of the present invention, it is obtained by polymerizing and crosslinking the monomer blending solution including at least polymerizable monomer from the acrylamide series, crosslinkable monomer, water, penetrant such as polyhydric alcohol, etc., and electrolytic salt. The monomer blending solution may include an epoxy crosslinker and a metallic ion sealing compound which has a vapor pressure at room temperature.

A further object of the present invention is to provide an organism-use electrode composed of the electrically conductive polymer gel and the electrode element.

DESCRIPTION OF THE EMBODIMENTS

An electrically conductive polymer gel in accordance with the present invention is composed of a polymer from the acrylamide series obtained by performing polymerization and crosslinking of a monomer blending solution by the use of a polymerization initiator. The electrically conductive polymer gel is suitably used as an electrode by forming it to adhere to an electrode element such as Ag/AgCl, germansilver, carbon, etc., to be one integral part. The electrically conductive polymer gel is also used as sensor elements for a temperature sensor, a pressure sensor, etc., and is used as the solid electrolyte solution for an electrolytic capacitor, a battery, etc. The monomer blending solution contains at least polymerizable monomer from the acrylamide series, copolymer, crosslinkable monomer, electrolytic salts, penetrant and water. In order to obtain an electrically conductive polymer gel which is not easily dried out, the polyhydric alcohol is added as a penetrant. For the monomer blending solution which includes the polyhydric alcohol as a penetrant, the water and the polyhydric alcohol are the major components. In order to obtain an electrically conductive polymer gel which has a strong adhesive property, an epoxy crosslinker which is reactive to the amide group of the side chain is added to the monomer blending solution. The epoxy crosslinker is reactive to the amide group of the side chain. In order to obtain an electrically conductive polymer gel having a property of corrosive resistant, the metallic ion sealing compound is added. Additionally, antiseptic, disinfectant, stabilizer, perfume, interfacial active agent, coloring agent and other agents may be added to the electrically conductive polymer gel if necessary.

For example, acrylamide, methacrylamide, etc., which are water soluble and non-electrolytic, can be used as the polymerizable monomer from the acrylamide series. For the crosslinkable monomer, the following materials may be used: N,N'-methylenebisacrylamide, N,N'-methylenebismethacrylamide, N,N'-ethylenebisacrylamide, N,N,-etylenebismethacrylamide, 1,2-diacrylamide ethylene glycol, di(tripoly)acrylate, di(tripoly)methacrylate, etc.

For the electrolytic salt, all the salts including sodium chloride, potassium chloride, magnesium chloride, etc., may be used. However, the salt which has polyatomic and small molecular weight is preferable. In particular, the chloride having polyatomic and small molecular weight is desirable for an electrode element of Ag/AgCl.

For the penetrant, monosaccharide, polysaccharide and polyhydric alcohol such as sorbitol, glycol, glyceline, etc., may be used.

There is no limitation on the way to carry out the polymerization and the crosslinking. When using the free-radical polymerization initiator, the polymerization initiator from the azo series such as azobis cyano valeric acid, azobis amidine propane 2 hydrochloride, etc., may be used. The redox initiator composed of (1) the reducer such as the ferrous sulfate, sodium dithionite, pyrosulfite, etc., and (2) the peroxide such as hydrogen peroxide, peroxo disulfate, etc., may be used as well. Note that the polymerization initiator from the azo series and the redox initiator may be used alone or together. It is also possible to carry out polymerization by the projection of light beam, electron beam, ultraviolet ray, etc.

The following materials may be used as the epoxy crosslinker: the ethylene glycol diglycidyl ether (112 WPE); polyethylene glycol diglycidyl ether (n=2; 150 WPE, n=4; 195 WPE, n=9; 280 WPE, n=13; 400 WPE, n=22; 600 WPE); triglycidyl 2 hydroxyethyl isocyanurate (250 WPE); trimethylolpropane polyglycidyl ether (140 WPE); glyceline polyglycidyl ether (150 WPE); sorbitol polyglycidyl ether (170 WPE); etc. It should be noted here that the epoxy crosslinker has preferably weight per epoxy number of not less than 200 WPE.

The following materials may be used as the metallic ion sealing compound under the condition of vapor pressure at room temperature: benzotriazole having a vapor pressure of 0.04 mmHg at 30° C.; tolyltriazole; dicyclohexyl ammonium nitrite having a vapor pressure of 0.0004 mmHg at 21° C.; cyclohexyl amine carbonate having a vapor pressure of 0.4 mmHg at 25° C.; di-isopropyl ammonium nitrite having a vapor pressure of 0.006 mmHg at 20° C.; etc. The benzotriazole and the tolyltriazole prevent Cu and Al from being corroded. On the other hand, the dicyclohexyl ammonium nitrite prevents Fe, Ni, Cr and Sn from being corroded. The cyclohexyl amine carbonate prevents Fe and Pb from being corroded. Similarly, the di-isopropyl ammonium nitrite prevents Fe from being corroded.

When the electrically conductive polymer gel shows low impedance and the accuracy thereof is improved, the current due to the corrosion is not negligible. Therefore, the metallic ion sealing compound is preferably added.

The following deals with the percentage composition of the electrically conductive polymer gel of the present invention. Hereinafter, % by weight is referred to as %.

The percentage composition of the acrylamide in the electrically conductive polymer gel is preferably set within a range of 13% to 25%. The reason why the lower limit of the acrylamide percentage composition is set to 13% is based on the fact that when the electrically conductive polymer gel is prepared with the acrylamide monomer amount of less than 13%, the ratio of the polymer main chains to the gel is too low to obtain the gel body having sufficient adhesive property. Thus, the electrolyte solution which is sealed in the mesh structure of the gel body cannot be maintained under stable condition. On the other hand, the reason why the upper limit of the acrylamide percentage composition is set to 25% is based on the fact that when the electrically conductive polymer gel is prepared with the acrylamide monomer quantity of above 25%, the gel body having sufficient polymer gel strength and adhesive property can be obtained, while the mesh structure of the gel body becomes to close so that the adhesive function decreases and the absolute amount of the electrolyte solution which can be sealed by the mesh is little, thereby making it impossible to prepare the target low impedance electrically conductive polymer gel.

The percentage composition of the crosslinkable monomer in the electrically conductive polymer gel is set within a range of 0.001% to 0.3%, preferably, within a range of 0.01% to 0.2% for the following reasons:

(1) When the percentage composition of the crosslinkable monomer is above 0.3%, the number of mesh crosslinking points connecting the main chains increases, thereby obtaining a gel body having apparently a high gel strength. However, the fragility (sectility) of the gel body increases which is likely to cause the amputation and breakdown due to the extension and compression;

(2) The increase of the crosslinking points develops the hydrophobic state of the main chains, thereby making it impossible to maintain the electrolyte solution which is sealed in the mesh structure of the gel body under stable condition. Therefore, the electrolyte solution is easily separated from the gel body;

(3) The follow-up with respect to the motion is lowered due to a drop in the degree of freedom of the main chains as the crosslinking points increase; and (4) When the percentage composition of the crosslinkable monomer is less than 0.001%, it is impossible to obtain the gel.

The penetrant in the electrically conductive polymer gel is preferably set within a range of 20% to 65%. The lower limit of the percentage composition is set to 20%, because when it is set below 20%, it dries out at a high speed, and an the gel cannot be maintained over time. Therefore, when measuring a biopotential, the impedance of the gel body increases. With the increase of the impedance, an accuracy of the measurement decreases, and thus an accurate measurement cannot be carried out over long periods of time. On the contrary, the upper limit of the percentage composition of the penetrant is set to 65% because when it is above 65%, the gel body cannot be easily dried out; however, the penetrant cannot be kept stable in the mesh structure consisting of the gel body, and the bleed of the gel body occurs which lowers the adhesive property. Moreover, the relative quantity of water becomes too low to obtain the target low impedance electrically conductive polymer gel.

The electrolytic salts in the electrically conductive polymer gel is preferably set within the range of 2% to 15%, more preferably, within a range of 2% to 8% for the following reason: The electrolytic neutral salts has a great effect on the impedance of the gel body in its correlation to the quantity of water, and plays an important role to determine the quality of the electrode. Specifically, when the percentage composition of the electrolytic neutral salts is below 2%, the impedance becomes too high to obtain a desirable electrode. On the other hand, when the percentage composition thereof is above 15%, it falls beyond the range which the electrolytic dissociation is permitted. This means that the addition of the salts becomes wasteful which only lowers percentage compositions of other components. Additionally, when the electrolytic salt is dissolved into the monomer blending solution, if the electrolytic salt is mixed after breaking it into pieces, it is efficiently dissolved by making the time required for dissolving shorter.

The proportion of water in the electrically conductive polymer gel is within a range of 20% to 65%, preferably, in a range of 30% to 65% for the following reasons. When the proportion of water is below 20%, the quantity of water in the gel body becomes too small to obtain a desirable electrical conductor, and thus a high impedance gel body cannot be obtained. On the other hand, when the proportion of water is above 65%, although a desirable electrically conductive property can be achieved, the water does not remain stable in the gel, and thus the gel dries out quickly. As a result, the impedance of the gel body increases during the measurement of a biopotential, which reduces the measuring accuracy, thereby making it impossible to carry out an accurate measurement over longer periods of time. In the electrically conductive polymer gel, the water in the gel is used for dissolving other components. This is one of the reasons why a gel of low impedance can be ensured.

The epoxy crosslinker is set within a range of 0.05% to 0.3%, preferably, within a range of 0.08% to 0.25%. This is because when it falls below 0.05%, a sufficient adhesive property cannot be ensured. On the other hand, when it is set above 0.3%, it becomes hard, fragile, and the desirable adhesive property cannot be obtained.

The metallic ion sealing compound is set within the percentage composition of 0.05% to 15% for the following reason: When it is set below 0.05%, it hardly contribute to prevent the occurrence of corrosion. On the other hand, when it is set above 15%, the blending solution is no more polymerized.

According to the manufacturing method of the present invention, the monomer blending solution is prepared the following manner: First, an acrylamide monomer or an aqueous solution thereof, a crosslinkable monomer, a penetrant such as polyhydric alcohol, electrolytic salts, etc., were prepared. Then, after adding a predetermined quantity of water, the above components were mixed by stirring, thereby obtaining a monomer blending solution in which the above components are uniformly dissolved. For the monomer blending solution which includes polyhydric alcohol as a penetrant, the water and the polyhydric alcohol are the major components. As a note, the quantity of water is preferably .set slightly larger than that required for dissolving the other components. Then, after adding a polymerization initiator, the monomer blending solution is heated up so as to carry out the polymerization and the crosslinking, thereby manufacturing an electrically conductive polymer gel. When the heating temperature is set within the range of 40° C. to 90° C., the polymerization crosslinking is almost completed within five minutes. However, it is preferable to keep heating for one hour to two hours so that the residual monomer does not exceed 20 ppm. The heating by ovens and heating by contacting are used as the way of heating. In order to prepare a polymer gel of sheet type having a thickness of 1 mm to 2 mm, the polymer gel is sandwiched between two thermal plates which are heated up for spreading the polymer gel to form it in a sheet, and heating it from both surfaces. With the application of heat, the polymerization and crosslinking of the monomer blending solution is uniformly carried out, and the uniform physical characteristics of the whole polymer gel can be achieved. Additionally, by providing net like reinforcing member made of fiber as the reinforcing member in an middle portion of the monomer blending solution or on the surface thereof when carrying out polarization and crosslinking, the electrically conductive polymer gel integrally formed with the reinforcing material in the middle portion or on the surface can be obtained which shows uniform characteristic and an tensile strength.

Figure 5:
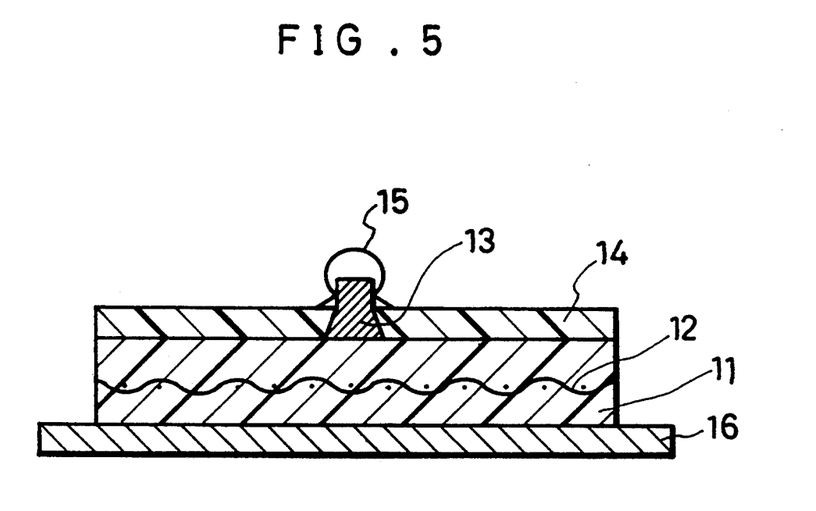
FIG. 5 is a cross-sectional view of the organism-use electrode.

FIG. 5 shows one example of the electrically conductive polymer gel used as an organism-use electrode. The organism-use electrode is arranged such that a surface member 14 is integrated by adhering to an electrically conductive polymer gel 11. The electrically conductive polymer gel 11 has a diameter of 40 mm and its middle portion is provided with a net 12 for reinforcing thereof. The surface member 14 is made of film which is provided so as to surround an electrode element 13. A top portion of the electrode element 13 is secured by a hook 15 for connecting a lead wire (not shown). The other surface of the electrically conductive polymer gel 11 adheres to a removable sheet 16.

For the electrode element, a polyethylene terephthalate resin film or an acrylonitrile-styrene resin film which is coated with Ag/AgCl powder or Ag, Ag-/AgCl, or carbon paste, or electrically conductive rubber may be used.

The configuration and effects of the electrically conductive polymer gel will be described below.

EXAMPLES 1-8 AND COMPARISON EXAMPLES 1-4

Impedance measurements were carried out with respect to electrically conductive polymer gels from the acrylamide series (examples 1-8) and electrically conductive polymer gels from polyacrylic acid sodium series (comparison examples 1 and 2) so as to clarify the differences in electrical properties.

First, (A) % of 40% acrylamide monomer aqueous solution as the polymerizable monomer, (B) % of N,N'-methylenebisacrylamide powder as a crosslinkable monomer, (G) % of glyceline as the polyhydric alcohol, (S) % of sodium chloride as the electrolytic neutral salts were prepared. Then, after adding the remaining percentage composition of water, the above materials were mixed so as to be dissolved, thereby obtaining a transparent monomer blending solution.

Then, the obtained monomer blending solution was mixed with $C_1$ % of 4% potassium peroxodisulfate aqueous solution (as the polymerization initiator) and $C_2$ % of 2% potassium pyrosulfite. Thereafter, the intermediate portion was provided with a net made of polyester monofilament and was heated up to 85° C. for two hours, thereby presenting an electrically conductive polymer gel having a thickness of 1 mm.

Next, the electrically conductive polymer gel manufactured in the above manner was formed so as to be a sample square of 20 mm, and the impedance $Z_1$ (ohm) of the single gel was measured. The detailed description of the measurement was described below. First, the sample was connected to a signal generator and oscilloscope by a coaxial cable, and the signal generator was adjusted as follows: (1) the output signal becomes 10 $V_{P-P}$ (peak to peak value); (2) the output signal has a sinusoidal wave form; and (3) the frequency is 10 Hz.

Figure 1:
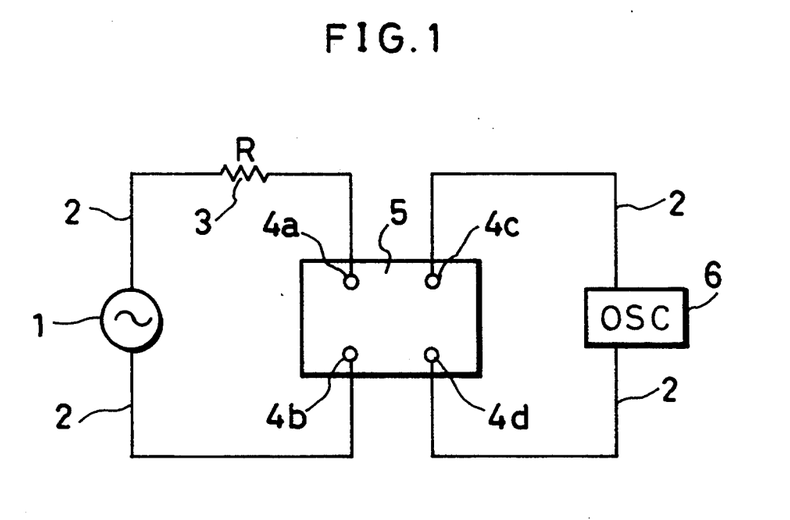
FIG. 1 is an explanatory view showing the conditions for measuring respective impedances of the electrically conductive polymer gel of the present invention.

After the adjustment, as shown in FIG. 1, output terminals of the signal generator 1 are connected to coaxial cables 2. One of the coaxial cable 2 was connected to a resistor 3 having resistance of R=1M-ohm, and one end of the coaxial cable 2 was connected to a silver electrode 4a while one end of the other coaxial cable 2 was connected to a silver electrode 4b. The silver electrode 4b and silver electrode 4a are paired with each other. The electrodes 4a and 4b were respectively adhered to the sample 5.

The plus input terminal and the minus input terminal of the oscilloscope (OSC) 6 were respectively connected to the coaxial cables 2. Respective ends of the coaxial cables 2 were connected to silver electrodes 4c and 4d. When voltage was applied to the sample 5 from the signal generator 1, a drop in voltage $V_2$ due to the sample 5 was measured by the oscilloscope 6.

Figure 2:
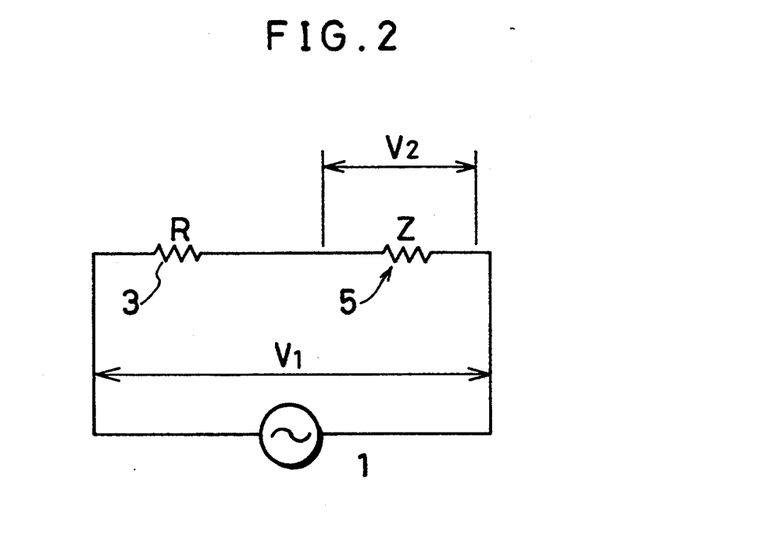
FIG. 2 is an electric circuit diagram of the explanatory view of FIG. 1.

The relationship among the signal generator 1, sample 5 and the oscilloscope 6 are equivalent to a circuit diagram of FIG. 2. For example, when it was assumed that the output voltage of the signal generator 1 was $V_1$, impedance $Z_1$ of the sample 5 was given by the following relational equation (1):

$$|Z| = R \times V_2 / (V_1 - V_2) \tag{1}$$

Impedance $Z_1$ (ohm) was obtained by supplying the voltage $V_2$ obtained by the oscilloscope 6, resistance R=1 (M-ohm) and voltage $V_1$=10 (V).

Further, two pairs of circular samples with a diameter of 20 mm of the electrically conductive polymer gel to which circular Ag/AgCl electrode elements with a diameter of 10 mm were adhered respectively were prepared. The respective gels were made in contact with one another so as to form an electrode pair, and the impedance $Z_{AgCl}$ (ohm) of the electrode pair was measured. Similarly, two pairs of circular samples with a diameter of 24 mm of the electrically conductive polymer gel to which circular carbon electrode elements with a diameter of 20 mm were adhered respectively were prepared. The respective gels were made in contact with one another so as to form an electrode pair, and the impedance $Z_C$ (ohm) of the electrode pair was measured. The above method for preparing the electrode pair is hereinafter referred to as a sample preparing method.

By changing (A), (B), (G), (S), ($C_1$) and ($C_2$) % of respective compositions of the electrically conductive polymer gels (examples 1-8) of Table 1, respective impedances $Z_1$, $Z_{AgCl}$ and $Z_C$ (ohm) were measured. The measured results are shown in Table 2.

TABLE 1

| COMPOSITION TABLE | | | | | | |
|---|---|---|---|---|---|---|
| | A | B | G | S | $C_1$ | $C_2$ |
| Example 1 | 33 | 0.10 | 30 | 8.0 | 5.0 | 5.0 |
| Example 2 | 45 | 0.10 | 25 | 8.0 | 5.0 | 5.0 |
| Example 3 | 60 | 0.10 | 20 | 8.0 | 5.0 | 5.0 |
| Example 4 | 33 | 0.05 | 50 | 6.0 | 4.5 | 4.0 |
| Example 5 | 45 | 0.05 | 40 | 6.0 | 4.5 | 4.0 |
| Example 6 | 60 | 0.05 | 20 | 6.0 | 4.5 | 4.0 |
| Example 7 | 30 | 0.06 | 40 | 2.0 | 4.5 | 4.5 |
| Example 8 | 35 | 0.07 | 50 | 2.0 | 4.5 | 4.5 |

TABLE 2

| | IMPEDANCE | | |
|---|---|---|---|
| | $Z_1$ | $Z_{AgCl}$ | $Z_c$ |
| Example 1 | 22 | 98 | 33 |
| Example 2 | 26 | 102 | 44 |
| Example 3 | 33 | 127 | 51 |
| Example 4 | 59 | 145 | 65 |
| Example 5 | 40 | 90 | 37 |
| Example 6 | 40 | 118 | 45 |

TABLE 2-continued

| | IMPEDANCE | | |
|---|---|---|---|
| | $Z_1$ | $Z_{AgCl}$ | $Z_c$ |
| Example 7 | 61 | 172 | 67 |
| Example 8 | 77 | 180 | 80 |

Then, ($A_{Na}$)% of 48% acrylic acid sodium aqueous solution was substituted for acrylamide of example 1, and the other compositions (B), (G), (S), ($C_1$) and ($C_2$)% were changed as the comparison examples 1 and 2 of Table 3 in order to measure the respective impedances $Z_1$, $Z_{AgCl}$ and $Z_C$ (ohm). The measured results are shown in Table 4.

TABLE 3

| COMPOSITION TABLE | | | | | | |
|---|---|---|---|---|---|---|
| | $A_{Na}$ | B | G | S | $C_1$ | $C_2$ |
| Comparison Example 1 | 41 | 0.27 | 30 | 0 | 5.5 | 4.0 |
| Comparison Example 2 | 50 | 0.25 | 40 | 0 | 5.5 | 4.0 |

TABLE 4

| | IMPEDANCE | | |
|---|---|---|---|
| | $Z_1$ | $Z_{AgCl}$ | $Z_C$ |
| Comparison Example 1 | 60 | 340 | 47 |
| Comparison Example 2 | 55 | 370 | 80 |

According to the results of the measurements, it was clarified that each electrically conductive polymer gel from the acrylamide series (examples 1-8) has a lower impedance than those from the acrylic acid sodium series (comparison examples 1 and 2). In particular, impedances ($Z_{AgCl}$) of the electrode pair, which was formed by contacting the gels with each other and by a use of the Ag/AgCl electrode, were substantially lowered. This is shown by comparing the impedances $Z_{AgCl}$ (ohm) of the first eight examples, which fill in a range of 90 ohm to 180 ohm with the impedances of the first and second comparison examples, which were respectively 340 ohm and 370 ohm. Accordingly, the electrical phenomena derived in the organism can be more accurately measured with the use of the electrically conductive polymer gel formed from an acrylamide polymer than one formed from a conventional electrically conductive polymer gel, such as one selected from the acrylic acid sodium salt series.

Next, a change per day of impedance of (1) the electrically conductive polymer gels from the acrylamide series (examples 3-5) and (2) those from acrylamide/sucrose series matrix (comparison examples 3 and 4) was measured in order to clarify the differences.

First, the electrically conductive polymer gels from the acrylamide/sucrose series matrix were prepared in the following manner: First, 15% of acrylamide monomer powder (100% pure), 0.04% of N,N'-methylenebisacrylamide powder as a crosslinkable monomer and 25% of sucrose powder for enhancing the adhesive property were prepared. Then, after adding 57.46% of water, the above materials were mixed so as to be dissolved, thereby obtaining the monomer blending solution.

Then, 1.00% of 2% ammonium peroxodisulfate aqueous solution (0.02% pure) as the polymerization initiator, and 1.50% of 2% tetramethylethylenediamide aqueous solution (0.03% pure) are added to the monomer blending solution and mixed. Thereafter, the polymerization crosslinking was carried out with respect to the mixed solution at room temperatures for one hour so as to obtain an electrically conductive polymer gel having a thickness of 1 mm (comparison example 3).

Subsequently, 15.0% of acrylamide monomer, 0.03% of N,N'-methylenebisacrylamide, 33% of sucrose powder were prepared. Then, after adding 49.47% of water, the above materials were mixed so as to be dissolved, thereby obtaining a monomer blending solution. As a result, an electrically conductive polymer gel having a thickness of 1 mm in accordance with comparison example 4 was manufactured.

The electrically conductive polymer gels of examples 3 and 5 having the percentage compositions of Table 1 and the electrically conductive polymer gel of comparison examples 3 and 4 were set under the condition of: temperature 23° C.; and humidity 65%. Then, a change per day of % by weight and a change per day of impedances Z(ohm) were measured in order to clarify the differences of the gels. Simultaneously, the free residual monomer ratio (Q) ppm was measured by the high-performance liquid chromatography (HPLC). Table 5 shows the measured % by weight, and Table 6 shows the impedances and the free residual monomer ratio (Q) ppm. Here, "-" in Table 6 indicates that the measurement could not carried out, and "ND" indicates that the free residual monomer ratio (Q) ppm is not more than the detection limit of the instrument (20 ppm).

TABLE 5

| CHANGE PER DAY OF % BY WEIGHT | | | | | | |
|---|---|---|---|---|---|---|
| | Before Drying | First Day | Second Day | Third Day | Fourth Day | Fifth Day |
| Example 3 | 100.0 | 91.0 | 85.3 | 80.5 | 78.8 | 78.3 |
| Example 5 | 100.0 | 93.8 | 89.9 | 87.0 | 85.0 | 83.4 |
| Comparison Example 3 | 100.0 | 85.5 | 74.4 | 61.8 | 54.0 | 49.2 |
| Comparison Example 4 | 100.0 | 84.5 | 73.0 | 65.2 | 60.7 | 57.6 |

TABLE 6

| CHANGE PER DAY OF IMPEDANCE | | | | | | | |
|---|---|---|---|---|---|---|---|
| | Before Drying | First Day | Second Day | Third Day | Fourth Day | Fifth Day | Q |
| Example 3 | 33 | 100 | 145 | 162 | 173 | 180 | ND |
| Example 5 | 40 | 90 | 120 | 130 | 135 | 140 | ND |
| Comparison Example 3 | 360 | 2,800 | 5,500 | 8,000 | 12,000 | 17,000 | 24,000 |
| Comparison Example 4 | 550 | 2,950 | 18,000 | — | — | — | 18,000 |

Q indicates the ratio of the free residual monomer (unit: ppm).

ND indicated that the free residual monomer is not more than the detection limit of the equipment (20 ppm).

Figure 3:
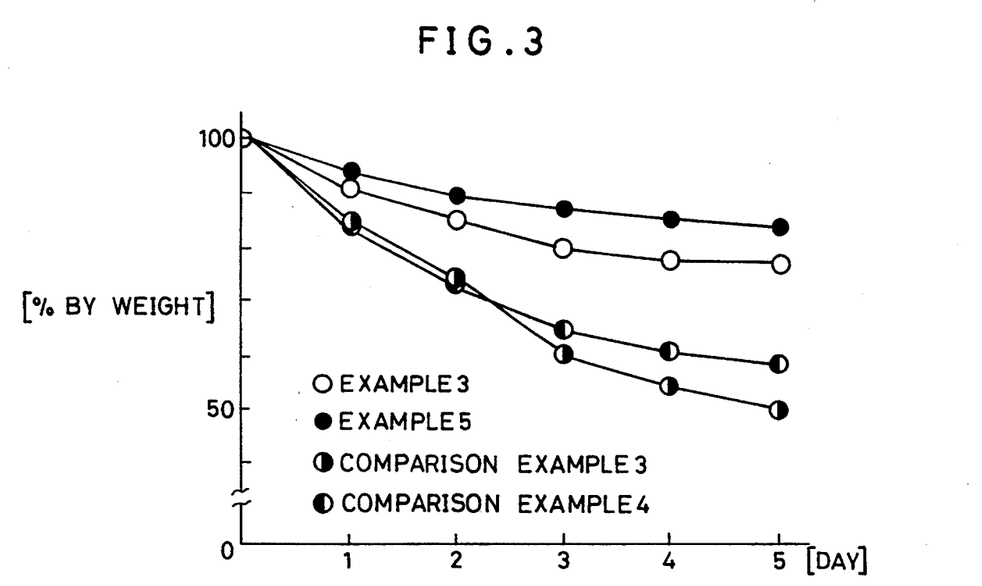
FIG. 3 is a graph showing a change per day of % by weight.
Figure 4:
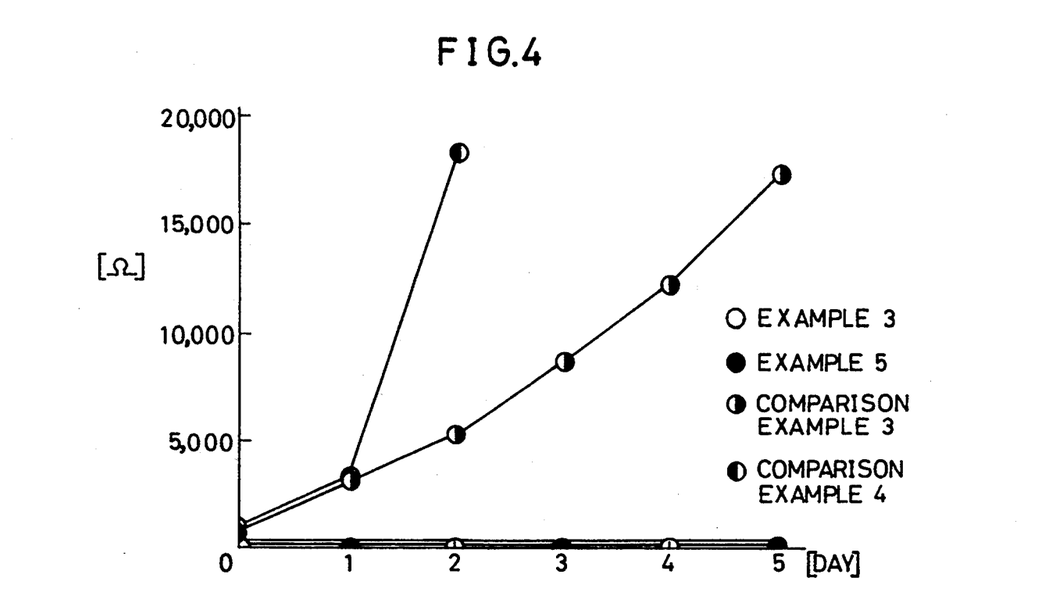
FIG. 4 is a graph showing a change per day of impedance.

FIGS. 3 and 4 represent graphically the results of measurements shown in Tables 5 and 6. As shown in the figures, the electrically conductive polymer gel which does not include polyhydric alcohol but includes sucrose (comparison examples 3 and 4) were dried out in shorter period of time than the electrically conductive polymer gel which includes polyhydric alcohol (examples 3 and 5). Moreover, in comparison examples 3 and 4, as being dried, impedance instantly shows rapid increase as the gel was been dried. On the other hand, in examples 3 and 5, low impedance was maintained over long periods of time. The experiments prove that the electrically conductive polymer gel of the present invention enables electrical phenomenon to be measured more precisely over longer periods of time compared with the electrically conductive polymer gel of acrylamide-sucrose-aqueous matrix.

The ratio of free residual monomer (Q) ppm in comparison examples 3 and 4 reached 24,000–18,000 ppm; whereas, the ratio of the free residual monomer (Q) ppm in examples 3 and 5 was below the detection limit of the device (20 ppm). The electrically conductive polymer gel obtained by polymerizing and crosslinking the acrylamide monomer blending solution was required that the free residual monomer ratio thereof was preferably lowered below 100 ppm, more preferably below 50 ppm since the acrylamide monomer was regarded as a specific chemical material. The electrically conductive polymer gel of acrylamide-sucrose-aqueous matrix in comparison examples 3 and 4 was not suitable for use in the organism; whereas, the electrically conductive polymer gel of the present examples permits a highly safe use thereof.

EXAMPLES 9-14

In lieu of the polyhydric alcohol and the electrolytic salt used in example 5, the proportions of these components are as set forth below. The polymerization initiator of examples 9–14 include 6.5% of $C_1$ and 4.5% of $C_2$. In examples 9, 12, 13 and 14 glycerine was the polyhydric alcohol. In example 10, diglycerol was the polyhydric alcohol. In example 12, the amount of the glycerine penetrant was 30% of the total gel. In examples 9, 10, 11, 12 and 14, 4% NaCl was the electrolytic salt. In example 13, 4% $MgCl_2$ was the electrolytic salt. In example 12, in addition to 4% NaCl, there was also used 10% $MgCl_2$. Other than the above, the gels of the present examples are similar to those of the previous example. Similarly, the change of impedance per day, and the change of the % by weight per day were measured. The results of measurements are shown in Tables 7a and 7b.

Specifically, the differences of the percentage compositions are as follows: 4% of sodium chloride in example 9; 4% of sodium chloride and 40% of diglycerol in example 10; 40% of decaglycerol laurate and 4% of sodium chloride in example 11; 30% of glycerol and 4% of sodium chloride and 10% of magnesium chloride in example 12; 4% of magnesium chloride in example 13; and 4% of potassium chloride in example 13.

TABLE 7a

| | Impedance | | | Change/Day of Impedance | | |
|---|---|---|---|---|---|---|
| | $Z_1$ | $Z_{AgCl}$ | $Z_C$ | First Day | Second Day | Third Day |
| Example 9 | 20 | 105 | 39 | 75 | 114 | 237 |
| Example 10 | 20 | 105 | 39 | 103 | 231 | — |
| Example 11 | 20 | 105 | 39 | 130 | 299 | — |
| Example 12 | 18 | 98 | 37 | 96 | 135 | 170 |
| Example 13 | 25 | 120 | 45 | 82 | 163 | 252 |
| Example 14 | 22 | 115 | 40 | 82 | 146 | 226 |

TABLE 7b

| | CHANGE/DAY OF % BY WEIGHT BY DRYING | | | |
|---|---|---|---|---|
| | Before Drying | First Day | Second Day | Third Day |
| Example 9 | 100.0 | 89.2 | 83.3 | 79.3 |
| Example 10 | 100.0 | 86.0 | 79.5 | — |
| Example 11 | 100.0 | 84.1 | 77.4 | — |
| Example 12 | 100.0 | 88.7 | 84.5 | 82.6 |
| Example 13 | 100.0 | 89.9 | 83.7 | 79.6 |
| Example 14 | 100.0 | 88.9 | 83.1 | 79.0 |

As described, diglycerol and decaglycerol laurate were used as polyhydric alcohol, and magnesium chloride and potassium chloride (examples 10–14) were used as electrolytic salt. However, as in the case of example 9, a great change per day of the impedance was not observed, and low impedance was maintained. Moreover, the obtained electrically conductive gel was not dried out easily.

EXAMPLES 15–23 AND COMPARISON EXAMPLES 5–12

Measurements of the impedance and adhesive property were carried out with respect to electrically conductive polymer gels which include the epoxy crosslinker (examples 15–21) and electrically conductive polymer gels which include neither the epoxy crosslinker nor crosslinking monomer (examples 22 and 23 and comparison examples 5 and 6) and electrically conductive polymer gels from acrylamide-sucrose-aqueous series matrix (comparison examples 7–10) in order to clarify the differences of electric properties and Of adhesive properties.

First, (A) % of a 40% acrylamide monomer aqueous solution (as polymerizable monomer), (B) % of N,N'-methylenebisacrylamide powder (as crosslinkable monomer), (EP) % of the ethylene glycol diglycidyl ether (n=22; 600 WPE) (as epoxy crosslinker), (G) % of glycerol which is the polyhydric alcohol (as the penetrant); and (S) % of sodium chloride (as electrolytic salt) were prepared. Then, after adding the remaining percentage composition of water (as solvent), the above materials were mixed so as to be dissolved. As a result, a colorless transparent monomer blending solution was obtained.

Then, the obtained monomer blending solution was mixed with $C_1$ % of 4% potassium peroxodisulfate aqueous solution (as the polymerization initiator) and $C_2$ % of 2% potassium pyrosulfite aqueous solution. Thereafter, a net was set as in previous first example, and the mixture was heated up for two hours at 85° C., thereby presenting an electrically conductive polymer gel having a thickness of 1 mm.

Further, two pairs of circular samples with a diameter of 20 mm of the electrically conductive polymer gel to which circular Ag/AgCl electrode elements with a diameter of 10 mm were adhered respectively were prepared. The respective gels were made in contact with one another so as to form an electrode pair, and the impedance $Z_{AgCl}$ (ohm) of the electrode pair was measured. Similarly, two pairs of circular samples with a diameter of 24 mm of the electrically conductive polymer gel to which circular carbon electrode elements with a diameter of 20 mm were adhered respectively were prepared. The respective gels were made in contact with one another so as to form an electrode pair, and the impedances $Z_1$, $Z_{AgCl}$ and $Z_C$ (ohm) of the electrode pair were measured.

Using a sample of the electrically conductive polymer gel, its adhesive strength (K) g was measured by vertical tensile testing (the leading end of the jig made of SUS has a cylindrical shape with a diameter of 12 mm). Using a sample of the electrically conductive polymer gel composition of this invention (20 mm × 120 mm), its adhesive strength (J) g was measured by 90° peeling test. These test are described in JIS adhesive tape and adhesive sheet testing Z0237-1980.

The respective percentage compositions (A), (B), (EP), (G), (S), ($C_1$) and ($C_2$) % of the electrically conductive polymer gel are changed as in the examples 15–21 of Table 8, and impedances $Z_1$, $Z_{AgCl}$ and $Z_C$ (ohm) and adhesive strength (K) grams and (L) grams were measured. Simultaneously, the proportion of the free residual monomer (Q) ppm were measured by the HPLC. The results of measurements are shown in Table 9.

TABLE 8

| | COMPOSITION TABLE | | | | | | |
|---|---|---|---|---|---|---|---|
| | A | B | EP | G | S | $C_1$ | $C_2$ |
| Example 15 | 33 | 0.015 | 0.10 | 50 | 2.0 | 5.0 | 4.0 |
| Example 16 | 40 | 0.015 | 0.12 | 45 | 3.0 | 4.0 | 4.0 |
| Example 17 | 45 | 0.015 | 0.14 | 35 | 4.0 | 4.0 | 3.0 |
| Example 18 | 60 | 0.015 | 0.16 | 25 | 5.0 | 3.0 | 3.0 |
| Example 19 | 33 | 0.020 | 0.14 | 30 | 6.0 | 5.0 | 5.0 |
| Example 20 | 40 | 0.020 | 0.16 | 25 | 8.0 | 4.0 | 4.0 |
| Example 21 | 45 | 0.020 | 0.18 | 30 | 6.0 | 4.0 | 4.0 |

TABLE 9

| | Impedance | | | Adhesive | | |
|---|---|---|---|---|---|---|
| | $Z_1$ | $Z_{AgCl}$ | $Z_C$ | K | L | Q |
| Example 15 | 65 | 83 | 37 | 380 | 103 | ND |
| Example 16 | 50 | 88 | 40 | 423 | 126 | ND |
| Example 17 | 42 | 91 | 42 | 448 | 217 | ND |
| Example 18 | 38 | 102 | 45 | 351 | 189 | ND |
| Example 19 | 28 | 93 | 35 | 362 | 78 | ND |
| Example 20 | 26 | 84 | 27 | 373 | 102 | ND |
| Example 21 | 42 | 89 | 38 | 402 | 135 | ND |

In the above Table, ND indicates that the detection limit of the equipment is not more than 20 ppm.

The respective percentage compositions (A), (B), (EP), (G), (S), ($C_1$) and ($C_2$) % of the electrically conductive polymer gel were changed as shown in Table 10, and impedances $Z_1$, $Z_{AgCl}$ and $Z_C$ (ohm), the ratio of the free residual monomer (Q) ppm of the gel which does not include the epoxy crosslinker in accordance with examples 22 and 23 and of the gel which does not include N,N'-methylenebisacrylamide as a crosslinkable monomer in accordance with comparison examples 5 and 6 and adhesives (K) grams and (L) grams were measured. The results of the measurements are as shown in Table 11.

TABLE 10

| | COMPOSITION TABLE | | | | | | |
|---|---|---|---|---|---|---|---|
| | A | B | EP | G | S | $C_1$ | $C_2$ |
| Example 22 | 33 | 0.020 | 0 | 50 | 5.0 | 5.0 | 5.0 |
| Example 23 | 45 | 0.050 | 0 | 40 | 4.0 | 3.0 | 3.0 |
| Comparison Example 5 | 33 | 0 | 0.10 | 30 | 3.0 | 4.0 | 4.0 |
| Comparison Example 6 | 45 | 0 | 0.18 | 20 | 2.0 | 5.0 | 5.0 |

TABLE 11

|  | Impedance | | | Adhesive | | N.B. |
|---|---|---|---|---|---|---|
|  | $Z_1$ | $Z_{AgCl}$ | $Z_C$ | K | L |  |
| Example 22 | 62 | 127 | 50 | 158 | 32 |  |
| Example 23 | 38 | 102 | 37 | 135 | 27 |  |
| Comparison Example 5 | — | — | — | — | — | no gel obtained |
| Comparison Example 6 | — | — | — | — | — | no gel obtained |

Next, electrically conductive polymer gels from the acrylamide/sucrose series are manufactured (comparison examples 7–10), and impedances ($Z_1$), ($Z_{AgCl}$) and ($Z_C$) (ohm) and adhesives (K) and (L) were measured.

First, ($A_2$) % of 100% acrylamide monomer powder (100% pure) as a polymerizable monomer, (B) % of N,N'-methylenebisacrylamide powder (as crosslinkable monomer), (M) % of sucrose powder as a tackifier were prepared, and after adding (W) % of water, the above materials were mixed so as to be dissolved, thereby obtaining a monomer blending solution. Then, the obtained monomer blending solution was mixed with ($C_3$) % of 2% potassium peroxodisulfate aqueous solution (as the polymerization initiator) and ($C_4$) % of 2% N,N,N',N'-tetramethylethylenediamine aqueous solution are added and mixed. The mixture was polymerized and crosslinked for one hour at room temperature, thereby obtaining an electrically conductive polymer gel having a thickness of 1 mm.

The respective percentage compositions ($A_2$), (B), (M) (W), ($C_3$) and ($C_4$) % of the electrically conductive polymer gel are changed as in the comparison examples 7–10 of Table 12, and impedances $Z_1$, $Z_{AgCl}$ and $Z_C$ (ohm) and adhesives (K) grams and (L) grams were measured. Simultaneously, the ratio of free residual monomer (Q) ppm were measured by a high speed liquid type chromatography. The results of measurements are shown in Table 13.

TABLE 12

| COMPOSITION TABLE | | | | | | |
|---|---|---|---|---|---|---|
|  | $A_2$ | B | M | W | $C_3$ | $C_4$ |
| Comparison Example 7 | 15.0 | 0.04 | 25 | 57.46 | 1.0 | 1.5 |
| Comparison Example 8 | 15.6 | 0.042 | 26 | 55.86 | 1.0 | 1.5 |
| Comparison Example 9 | 15.0 | 0.03 | 33 | 49.47 | 1.0 | 1.5 |
| Comparison Example 10 | 15.6 | 0.031 | 34.3 | 47.57 | 1.0 | 1.5 |

TABLE 13

|  | Impedance | | | Adhesive | | Residual Monomer |
|---|---|---|---|---|---|---|
|  | $Z_1$ | $Z_{AgCl}$ | $Z_C$ | K | L | Q |
| Comparison Example 7 | 360 | 650 | 37 | 112 | 21 | 24,000 |
| Comparison Example 8 | 370 | 680 | 400 | 124 | 25 | 22,000 |
| Comparison Example 9 | 550 | 830 | 570 | 137 | 32 | 18,000 |
| Comparison Example 10 | 570 | 880 | 600 | 131 | 29 | 18,000 |

From the results of the measurements, in examples 15–21, the impedances $Z_1$, $Z_{AgCl}$ and $Z_C$ (ohm) are respectively in ranges of 26 ohm to 65 ohm, of 83 ohm to 102 ohm and of 27 ohm to 45 ohm. Since the measured impedances are not significantly different from the impedances $Z_1$, $Z_{AgCl}$ and $Z_C$ (ohm) of examples 22 and 23, it is proved that the epoxy crosslinker does not affect the electrical properties.

On the other hand, adhesives (K) grams and (L) grams of examples 15–21 are respectively in a range of 351 g to 448 grams and of 78 grams to 217 grams, and adhesives (K) grams and (L) grams of comparison examples 7–10 are respectively in a range of 112 grams to 158 grams and of 21 grams to 32 grams. The results of experiments show that the adhesive of examples 15–21 is more that double the adhesive of comparison examples 5–12. Thus, the electrically conductive polymer gel of the present embodiment which includes epoxy crosslinker has a property of high adhesive while maintaining low impedance.

The ratio of the free residual monomer (Q) ppm in comparison examples 7–10 reached 18,000–24,000 ppm; whereas, the ratio of the free residual monomer (Q) in examples 15–21 is below the detection limit of the device (20 ppm). Therefore, the electrically conductive polymer gels of acrylamide-sucrose-aqueous matrix in comparison examples 7–10 are not suitable for use in the organism; whereas, the electrically conductive polymer gel of the present examples permits a highly safe use thereof in the organism.

EXAMPLES 24–27

In examples 24–27, different penetrants are used: glycerol (example 24); glucose as a penetrant (example 25); fructose (example 26); and sucrose (example 27). The respective percentage compositions (A), (B), (EP), (G), (S), ($C_1$) and ($C_2$) % of the electrically conductive polymer gel were changed as shown in table 14, and impedances $Z_1$, $Z_{AgCl}$ and $Z_C$ (ohm), adhesives (K) grams and (L) grams, a change per day of weight % by drying and a change per day of impedance were measured. The results of measurements are shown in Tables 15a–15c.

TABLE 14

| COMPOSITION TABLE | | | | | | | |
|---|---|---|---|---|---|---|---|
|  | A | B | EP | G | S | $C_1$ | $C_2$ |
| Example 24 | 45 | 0.015 | 0.14 | 40 | 4.0 | 6.0 | 4.5 |
| Example 25 | 45 | 0.015 | 0.14 | 40 | 4.0 | 6.0 | 4.5 |
| Example 26 | 45 | 0.015 | 0.14 | 40 | 4.0 | 6.0 | 4.5 |
| Example 27 | 45 | 0.015 | 0.14 | 40 | 4.0 | 6.0 | 4.5 |

TABLE 15a

|  | Ability Before Drying | | | Adhesive | |
|---|---|---|---|---|---|
|  | $Z_1$ | $Z_{AgCl}$ | $Z_C$ | K | L |
| Example 24 | 20 | 105 | 39 | 450 | 198 |
| Example 25 | 20 | 105 | 39 | 432 | 189 |
| Example 26 | 20 | 105 | 39 | 418 | 192 |
| Example 27 | 20 | 98 | 37 | 428 | 190 |

TABLE 15b

| Change/Day of Weight % by Drying | | | | |
|---|---|---|---|---|
|  | Before Drying | First Day | Second Day | Fifth Day |
| Example 24 | 100.0 | 89.2 | 83.3 | 79.3 |
| Example 25 | 100.0 | 83.8 | 77.9 | 70.8 |
| Example 26 | 100.0 | 82.2 | 76.5 | 73.4 |
| Example 27 | 100.0 | 83.6 | 78.6 | 75.1 |

TABLE 15c

| | Change/Day of Impedance | | |
|---|---|---|---|
| | First Day | Second Day | Third Day |
| Example 24 | 76 | 152 | 246 |
| Example 25 | 138 | 286 | 690 |
| Example 26 | 168 | 341 | 500 |
| Example 27 | 141 | 262 | 405 |

The electrically conductive polymer gels in which glucose, fructose and sucrose were respectively used as penetrant in lieu of glycerol show approximately same adhesive as the electrically conductive polymer gel in which glycerol was used. However, the differences are significant in the daily change of % by weight, caused by drying and in the daily change of the impedance of the gel. The electrically conductive polymer gel which contains glycerol is the best followed by the gel containing sucrose, fructose and glucose in this order.

EXAMPLES 28-39

Impedance measurements are carried out with respect to electrically-conductive polymer gels which includes the metallic ion sealing compound (examples 28-37) and electrically conductive polymer gels which includes no metallic ion sealing compound (examples 38 and 39) so as to clarify the differences of electric properties and of corrosivity.

First, (A) % of 40% acrylamide monomer aqueous solution as polymerizable monomer, (B) % of N,N'-methylenebisacrylamide powder (as crosslinkable monomer), (G) % of glycerol (polyhydric alcohol) as penetrant, (S) % of sodium chloride as electrolytic salt, (I) % of benzotriazole or tolyltriazole as a metallic ion sealing compound were prepared. After adding remaining wt % of water as a solvent, the above materials were mixed so as to be dissolved, thereby obtaining a colorless transparent monomer blending solution.

Then, the obtained monomer blending solution was mixed with ($C_1$) % of 4% potassium peroxodisulfate aqueous solution (as the polymerization initiator) and ($C_2$) % of 2% potassium pyrosulfite aqueous solution, and a net is set in the same manner as the example 1. Thereafter, the mixture was heated up for two hours at 85° C., thereby manufacturing an electrically conductive polymer gel having a thickness of 1 mm.

Next, two pairs of circular samples with a diameter of 20 mm of the electrically conductive polymer gel to which circular Ag/AgCl electrode elements with a diameter of 10 mm were adhered respectively were prepared. The respective gels were made in contact with one another so as to form an electrode pair, and the impedance $Z_{AgCl}$ (ohm) of the electrode pair was measured. Similarly, two pairs of circular samples with a diameter of 24 mm of the electrically conductive polymer gel to which circular carbon electrode elements with a diameter of 20 mm were adhered respectively were prepared. The respective gels were made in contact with one another so as to form an electrode pair, and the impedances $Z_1$, $Z_{AgCl}$ and $Z_C$ (ohm) of the electrode pair were measured.

A sample of the electrically conductive polymer gel of this invention was laminated on a german silver cube, and left at room temperature and humidity (25° C. and 50% relative humidity). Then, after 24, 48 and 168 hours, respectively, the state of the german silver and the change in color of the electrically conductive polymer gel and of the german silver were observed. The observed states are classified into five stages: "I" no change was observed; "II" subtle change was observed; "III" a slight mark remains on the german silver and the gel is slightly changed in color; "IV" a mark remains on the german silver and the gel is changed in color. Additionally, when a gel was not generated and thus a measurement could not carried out, it is denoted as no gel generated "-".

The respective proportions of the components (A), (B), (G), (S), (I), ($C_1$) and ($C_2$) % of the electrically conductive polymer gel are changed as in the examples 28-39 of Table 16, and the impedances $Z_1$, $Z_{AgCl}$ and $Z_C$ (ohm), and corrosivity were measured and observed. The results of measurements are shown in Table 17.

TABLE 16

COMPOSITION TABLE

| | A | B | G | D | E | $C_1$ | $C_2$ |
|---|---|---|---|---|---|---|---|
| Example 28 | 33 | 0.10 | 30 | 8.0 | 0.1 | 5.0 | 5.0 |
| Example 29 | 45 | 0.10 | 25 | 8.0 | 0.5 | 5.0 | 5.0 |
| Example 30 | 60 | 0.10 | 20 | 8.0 | 1.0 | 5.0 | 5.0 |
| Example 31 | 33 | 0.05 | 50 | 6.0 | 1.5 | 4.5 | 4.0 |
| Example 32 | 45 | 0.05 | 40 | 4.0 | 2.0 | 4.5 | 4.0 |
| Example 33 | 60 | 0.05 | 20 | 4.0 | 2.5 | 4.5 | 4.0 |
| Example 34 | 30 | 0.06 | 40 | 2.0 | 5.0 | 4.5 | 4.5 |
| Example 35 | 35 | 0.07 | 40 | 2.0 | 10.0 | 4.5 | 4.5 |
| Example 36 | 33 | 0.05 | 50 | 6.0 | 0.05 | 4.5 | 4.0 |
| Example 37 | 33 | 0.05 | 30 | 6.0 | 15.0 | 4.5 | 4.0 |
| Example 38 | 45 | 0.05 | 40 | 4.0 | 0.0 | 4.5 | 4.0 |
| Example 39 | 60 | 0.05 | 20 | 6.0 | 0.0 | 4.5 | 4.0 |

TABLE 17

IMPEDANCE

| | $Z_1$ | $Z_{AgCl}$ | $Z_C$ | Corrosivity | N.B. |
|---|---|---|---|---|---|
| Example 28 | 22 | 108 | 41 | II | |
| Example 29 | 26 | 112 | 47 | II | |
| Example 30 | 33 | 135 | 58 | A | |
| Example 31 | 61 | 187 | 60 | I | |
| Example 32 | 40 | 113 | 40 | I | |
| Example 33 | 25 | 89 | 28 | I | |
| Example 34 | 61 | 180 | 73 | I | |
| Example 35 | 77 | 189 | 85 | I | |
| Example 36 | 62 | 177 | 59 | III | |
| Example 37 | — | — | — | — | no gel obtained |
| Example 38 | 36 | 97 | 29 | VI | |
| Example 39 | 40 | 128 | 51 | VI | |

From the results of the measurements, in examples 28-37, the impedances $Z_1$, $Z_{AgCl}$ and $Z_C$ (ohm) are respectively in ranges of 22 ohm to 77 ohm, of 89 ohm to 189 ohm and of 28 ohm to 85 ohm. Since the measured impedances are approximately the same as the impedances $Z_1$, $Z_{AgCl}$ and $Z_C$ (ohm) of examples 38 and 39, it is shown that the metallic ion sealing compound has no effect on the electrical properties. As for corrosivity, the corrosivity in examples 28-37 was "I" or "II", whereas, the corrosivity in examples 38 and 39 without the metallic ion sealing compound was "IV". The experiment proved that the inclusion of a metallic ion sealing compound diminished the corrosivity.

Additionally, when the metallic ion sealing compound was set to 15% (example 37), no gel was generated, and when the metallic ion sealing compound was set to 0.05% (example 36), the corrosivity was "C". Thus, the metallic ion sealing compound is preferably set within a range of 0.05%-15% by weight in order to manufacture the electrically conductive polymer gel having desirable corrosivity.

EXAMPLES 40-51

Impedance, corrosivity and adhesive property were measured and observed with respect to electrically conductive polymer gels which include a metallic ion sealing compound. The adhesive properties thereof were increased by the inclusion of an epoxy crosslinker (examples 40-47), as compared with respect to electrically conductive polymer gels which include no metallic ion sealing compound (examples 48-51).

First, wt % of the polyethylene glycol diglycidyl ether (n=22;600 WPE) was added to the monomer blending solution having percentage compositions of (A), (B), (G), (S), (I), ($C_1$) and ($C_2$) % as shown in Table 18. Then, the electrically conductive gels of examples 40-51 were manufactured as in the same manner as example 1, and impedances $Z_1$, $Z_{AgCl}$ and $Z_C$ (ohm) and corrosivity were measured and observed. As to corrosivity, the state of the electrically conductive polymer gel is denoted as corrosivity 1 and that of electrode of german silver for organism is denoted as corrosivity 2. The results of measurement and observation are shown in Table 19.

TABLE 18

COMPOSITION TABLE

| | A | B | G | S | I | $C_1$ | $C_2$ | EP |
|---|---|---|---|---|---|---|---|---|
| Example 40 | 33 | 0.015 | 50 | 2.0 | 3.0 | 5.0 | 4.0 | 0.10 |
| Example 41 | 40 | 0.015 | 45 | 3.0 | 2.0 | 4.0 | 4.0 | 0.14 |
| Example 42 | 45 | 0.018 | 40 | 4.0 | 1.0 | 4.0 | 3.0 | 0.18 |
| Example 43 | 60 | 0.018 | 25 | 5.0 | 0.5 | 3.0 | 3.0 | 0.16 |
| Example 44 | 33 | 0.020 | 30 | 6.0 | 4.0 | 5.0 | 5.0 | 0.14 |
| Example 45 | 40 | 0.020 | 25 | 8.0 | 5.0 | 4.0 | 3.0 | 0.16 |
| Example 46 | 45 | 0.020 | 30 | 6.0 | 10.0 | 4.0 | 4.0 | 0.18 |
| Example 47 | 33 | 0.020 | 50 | 5.0 | 0.1 | 5.0 | 5.0 | 0.10 |
| Example 48 | 45 | 0.020 | 40 | 4.0 | 0.0 | 3.0 | 3.0 | 0.12 |
| Example 49 | 33 | 0.020 | 30 | 3.0 | 0.0 | 4.0 | 4.0 | 0.14 |
| Example 50 | 40 | 0.015 | 40 | 4.0 | 0.0 | 4.0 | 4.0 | 0.16 |
| Example 51 | 45 | 0.015 | 30 | 2.0 | 0.0 | 5.0 | 5.0 | 0.18 |

TABLE 19

IMPEDANCE

| | $Z_1$ | $Z_{AgCl}$ | $Z_C$ | L | M | Corrosivity 1 | Corrosivity 2 |
|---|---|---|---|---|---|---|---|
| Example 40 | 65 | 95 | 40 | 382 | 109 | I | I |
| Example 41 | 48 | 97 | 42 | 425 | 129 | I | I |
| Example 42 | 43 | 103 | 45 | 450 | 207 | I | I |
| Example 43 | 36 | 115 | 47 | 355 | 191 | I | I |
| Example 44 | 30 | 106 | 38 | 364 | 80 | I | I |
| Example 45 | 38 | 94 | 27 | 377 | 108 | I | I |
| Example 46 | 42 | 100 | 40 | 408 | 137 | I | I |
| Example 47 | 62 | 82 | 56 | 357 | 77 | III | III |
| Example 48 | 37 | 90 | 41 | 359 | 93 | IV | III |
| Example 49 | 35 | 87 | 40 | 360 | 75 | IV | III |
| Example 50 | 38 | 89 | 40 | 362 | 111 | IV | III |
| Example 51 | 39 | 98 | 51 | 389 | 137 | IV | III |

From the results of the measurements, in examples 40-47, the impedances $Z_1$, $Z_{AgCl}$ and $Z_C$ (ohm) are respectively in ranges of 30 ohm to 65 ohm, of 82 ohm to 115 ohm and of 27 ohm to 56 ohm. Since the measured impedances are approximately the same as the impedances $Z_1$, $Z_{AgCl}$ and $Z_C$ (ohm) of examples 48-51, it is proved that the existence and amount of the metallic ion sealing compound have no effect on the electrical properties. The adhesives (L) grams and (M) grams of the gels in examples 40-47 are respectively in ranges of 355 grams to 450 grams and of 77 grams to 207 grams. Since the measured adhesive properties are approximately the same as the the adhesives (L) grams and (M) grams of examples 48-51, it is proved that the existence and amount of the metallic ion sealing compound have no effect on the electrical properties of the electrically conductive polymer gels including the epoxy crosslinker.

As for corrosivity, the corrosivities 1 and 2 in examples 40-46 were "I", whereas, those in examples 48-51 without the metallic ion sealing compound were "III" or "IV". The experiment proved that the metallic ion sealing compound improves the corrosivity. Additionally, when the metallic ion sealing compound was set 0.1% (example 43), the corrosivity was "III". Thus, the metallic ion sealing compound is preferably set above 0.1% in order to manufacture the electrically conductive polymer gel having desirable low corrosivity.

As described in detail above, the electrically conductive polymer gel of the present invention includes large quantity of a mixture of water and polyhydric alcohol as major components, and an electrolytic salt in the polyacrylamide polymer gel. Thus, the gel itself shows low impedance. The electrically conductive polymer gel is used as an organism-use electrode by adhering it to an electrode element to be one integral structure.

The polyacrylamide polymer has hydrophilic and nonelectrolyte properties. Thus, electric repulsion between the polyacrylamide the polymer and metal electrode element is not likely to occur and impedance at the contact interface will not increase much. Even if an amide group is neutralized in the gel body and a proton shift occurs, the system of reaction represented by the following formula can be inferred between the gel and a metal (such as Ag) of the electrode element.

$$nR-\underset{\underset{O}{\|}}{C}-NH_2 + M^{n+} \underset{k_2}{\overset{k_1}{\rightleftarrows}} \left(R-\underset{\underset{O}{\|}}{C}-NH\right)_n M + nH^+$$

$$k_1 << k_2$$

Thus, the electrically conductive polymer gel of the present invention has the following advantageous characteristics: the impedance thereof is low; a desirable electrical contact can be achieved with electrode element; and the impedance of the junction as a whole is low. With the property of low impedance, the electrically conductive polymer gel permits accurate measurement even with a weak electric signal.

According to the electrically conductive polymer gel of the present invention, since the polyhydric alcohol in the gel lowers the drying speed of the gel, an increase in the impedance as the gel is drying out can be prevented. As a result, the electrically conductive polymer gel of the present invention permits an accurate measurement of an electric phenomenon generated in organisms, etc., for longer periods of use.

The electrically conductive polymer gel of the present invention is composed of a polyacrylamide series polymer crosslinked at least by an epoxy crosslinker, which includes water, a penetrant and an electrolytic salt uniformly dissolved therein, the water and the penetrant being major components of the polymer gel. The electrically conductive polymer gel is used as an organism-use electrode by adhering it to an electrode element to be one integral part. Moreover, as represented by the following chemical formula, the electrically conductive polymer gel of the present invention permits an adjustment of the crosslinking distance with the use of an epoxy crosslinker. Thus, desirable viscosity and adhesive property of the electrically conductive polymer gel can be achieved.

Therefore, as a desirable contact between the gel and an electrode element can be achieved, an accurate measurement can be carried out from an objective of the measurement such as a skin surface without reducing the degree of freedom of a target organism.

The electrically conductive polymer gel of the present invention may further include a metallic ion sealing compound which has vapor pressure at room temperature. The electrically conductive polymer gel is used as an organism-use element by forming it adhere to an electrode element to be one integral part.

Moreover, the metallic ion sealing compound of the electrically conductive polymer gel seals the metallic ion, the corrosion of the electrode element can be prevented. Therefore, since electromotive force generated due to corrosion can be prevented, occurrence of error due to the electromotive force will not occur. This permits the organism-use electrode to be repetitively used or used for long periods of time. Moreover, the gel can be used by forming it to adhere to the electrode element beforehand.

More specifically, in the case where benzotriazole is used as a metallic ion sealing compound, and copper is included in the electrode element, since the benzotriazole as a metallic ion sealing compound has vapor pressure at around room temperature, the benzotriazole serves as a rust preventive. Thus, the copper is ionized, in the same time, the copper becomes cupric benzotriazole, thereby forming a transparent molecular coat on the electrode element surface. Since a corrosive environment is shut off by the molecular coat, a change in color thereof into verdigris can be prevented.

As aforementioned, according to the method for manufacturing the electrically conductive polymer gel of the present invention, the electrically conductive polymer gel is obtained by polymerizing and crosslinking the monomer blending solution including at least acrylamide series polymerizable monomer, crosslinkable monomer, water, polyhydric alcohol, penetrant and electrolytic salt. The monomer blending solution may include an epoxy crosslinker and metallic ion sealing compound.

Since the monomer blending solution includes water, each component in the solution can be uniformly dissolved therein. The polymerization and crosslinking reactions occur by applying heat or projecting electron beam or light. Thus, the gel can be manufactured in relatively simple manner. Additionally, if the percentage component of water is set just enough for blending other components, the electrically conductive polymer gel can be used without after treatment, i.e., taking out an excessive quantity of water after polarizing and crosslinking reactions.

The organism-use electrode element using the electrically conductive polymer gel of the present invention permits an accurate measurement under longer periods of use. Since the corrosion of the electrode element can be prevented, the electrode element can be used for longer time or repetitively used without measurement errors. Moreover, the electrode element using the electrically conductive polymer gel of the present invention is suitable as a organism-use element for its excellent ability to adhere to the skin of the organism.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. An electrically conductive polymer gel comprising:
    a crosslinked polyacrylamide polymer,
    a mixture of a polyhydric alcohol penetrant and 20 to 65 weight percent, based on the weight of the entire gel, of water, and
    an electrolytic salt uniformly dissolved in said mixture; wherein said mixture of water and said polyhydric alcohol penetrant is the major component of said polymer gel.

2. The electrically conductive polymer gel as set forth in claim 1, consisting essentially of 13-25 weight % of said polyacrylamide polymer; 20-65 weight % of water; 20-65 weight % of said polyhydric alcohol; and 2-15 weight % of said electrolytic salt.

3. An integral unit comprising an electrically conductive polymer gel composition as set forth in claim 1 adhered to an electrode element.

4. A sensor element comprising an electrically conductive polymer gel as set forth in claim 1.

5. A solid electrolyte solution comprising an electrically conductive polymer gel as set forth in claim 1.

6. An adhesive electrically conductive polymer gel composition comprising:
    a polyacrylamide polymer crosslinked by at least an epoxy crosslinker,
    a mixture of water and a penetrant, and an electrolytic salt uniformly dissolved in said mixture,
    wherein said water comprises 20 to 65 weight percent of said gel;
    wherein said mixture of water and said penetrant is the major component of said polymer gel; and
    wherein said epoxy cross linking causes said gel to have improved adhesion as compared to the same composition in which the acrylamide polymer is otherwise cross linked.

7. The electrically conductive polymer gel composition as set forth in claim 6, wherein said epoxy crosslinker is about 0.05-0.3 weight % of said composition.

8. The electrically conductive polymer gel as set forth in claim 1 or 6 further including a metallic ion sealing compound which has a vapor pressure at room temperature.

9. The electrically conductive polymer gel as composition set forth in claim 8, wherein said metallic ion sealing compound is about 0.05 weight % of said composition.

10. An integral unit comprising an electrically conductive polymer gel composition as set forth in claim 8, adhered to an electrode element.

11. A sensor element comprising an electrically conductive polymer gel as set forth in claim 8.

12. A solid electrolyte solution comprising an electrically conductive polymer gel as set forth in claim 8.

13. An integral unit comprising an electrically conductive polymer gel as set forth in claim 6 adhered to an electrode element.

14. A sensor element comprising an electrically conductive epoxy cross linked polymer gel as claimed in claim 6.

15. A solid electrolyte solution comprising an epoxy cross linked electrically conductive polymer gel as claimed in claim 6.

16. A method for manufacturing an electrically conductive polymer gel composition comprising:
polymerizing and crosslinking a monomer blending solution comprising:
20 to 65 weight percent water,
a polyhydric alcohol,
an acrylamide polymerizable monomer,
a crosslinkable monomer, and
an electrolytic salt,
wherein the combination of said water and said polyhydric alcohol is the major component of said polymer gel composition.

17. The method for manufacturing an electrically conductive polymer gel composition as set forth in claim 16 including polymerizing and crosslinking the monomer blending composition at a temperature range of 50°–90° C.

18. The method for manufacturing electrically conductive polymer gel composition as set forth in claim 16, including polymerizing and crosslinking the monomer blending solution for 1–2 hours at a temperature range of 40°–90° C.

19. The method for manufacturing electrically conductive polymer gel composition as set forth in claim 16 including polymerizing and crosslinking the monomer blending composition disposed between a pair of thermal plates positioned to heat said monomer blending composition from both surfaces.

20. The method for manufacturing electrically conductive polymer gel composition as set forth in claim 16 including polymerizing and crosslinking the monomer blending composition having a net reinforcing material submersed in or on a surface of the monomer blending composition.

21. The method for manufacturing electrically conductive polymer gel composition as set forth in claim 16, wherein the components of said gel composition comprise: said acrylamide polymer, 13–25 weight %; said crosslinkable monomer, 0.001–0.3 weight %; said water, 20–65 weight %; said polyhydric alcohol, 20–65 weight %; and said electrolytic salt, 2–15 weight %.

22. A method for manufacturing an electrically conductive polymer gel composition comprising polymerizing and crosslinking a monomer blending composition comprising:
an acrylamide polymerizable monomer,
a crosslinkable monomer,
20 to 65 weight percent water,
a penetrant, an electrolytic neutral salt, and
an epoxy crosslinker.

23. The method for manufacturing an electrically conductive polymer gel as set forth in claim 16 or 22, wherein:
said monomer blending solution includes metallic ion sealing compound which has a vapor pressure at room temperature.

24. The method for manufacturing an electrically conductive polymer gel composition as set forth in claim 22 including polymerizing and crosslinking the monomer blending composition at a temperature range of 50°–90° C.

25. An organism-use electrode system comprising:
an organism having in electrical contact therewith;
an electrically conductive polymer gel comprising:
a crosslinked polyacrylamide polymer;
a mixture of a polyhydric alcohol penetrant and 20 to 65 weight percent, based on the total weight of the gel, of water; and
an electrolyte salt uniformly dissolved in said mixture,
wherein said mixture of water and said polyhydric alcohol is the major component of said polymer gel; and
an electrode element in electrical contact with said gel and through said gel said organism.

26. An organism-use electrode system comprising:
an organism having adhered thereto in electrical contact therewith;
an electrically conductive polymer gel comprising:
a polyacrylamide polymer crosslinked by at least an epoxy crosslinker,
a mixture of a penetrant and 20 to 65 weight percent, based on the total weight of the gel, of water, and
an electrolytic salt uniformly dissolved in said mixture,
wherein the mixture of said water and said penetrant is the major component of said polymer gel; and
an electrode element in electrical contact with said gel and through said gel said organism.

27. The organism-use electrode element as set forth in claim 25 or 26, wherein:
said electrically conductive polymer gel further includes a metal ion sealing compound having vapor pressure at room temperature.

28. The method for manufacturing electrically conductive polymer gel composition as set forth in claim 22 including polymerizing and crosslinking the monomer blending composition disposed between a pair of thermal plates positioned to heat said solution from both surfaces.

29. The method for manufacturing electrically conductive polymer gel composition as set forth in claim 22 including polymerizing and crosslinking the monomer blending composition having a net reinforcing material submerged in or on a surface of the monomer blending composition.

* * * * *